(No Model.)
J. C. TESTMAN.
HAY STACKER.
No. 277,378. Patented May 8, 1883.
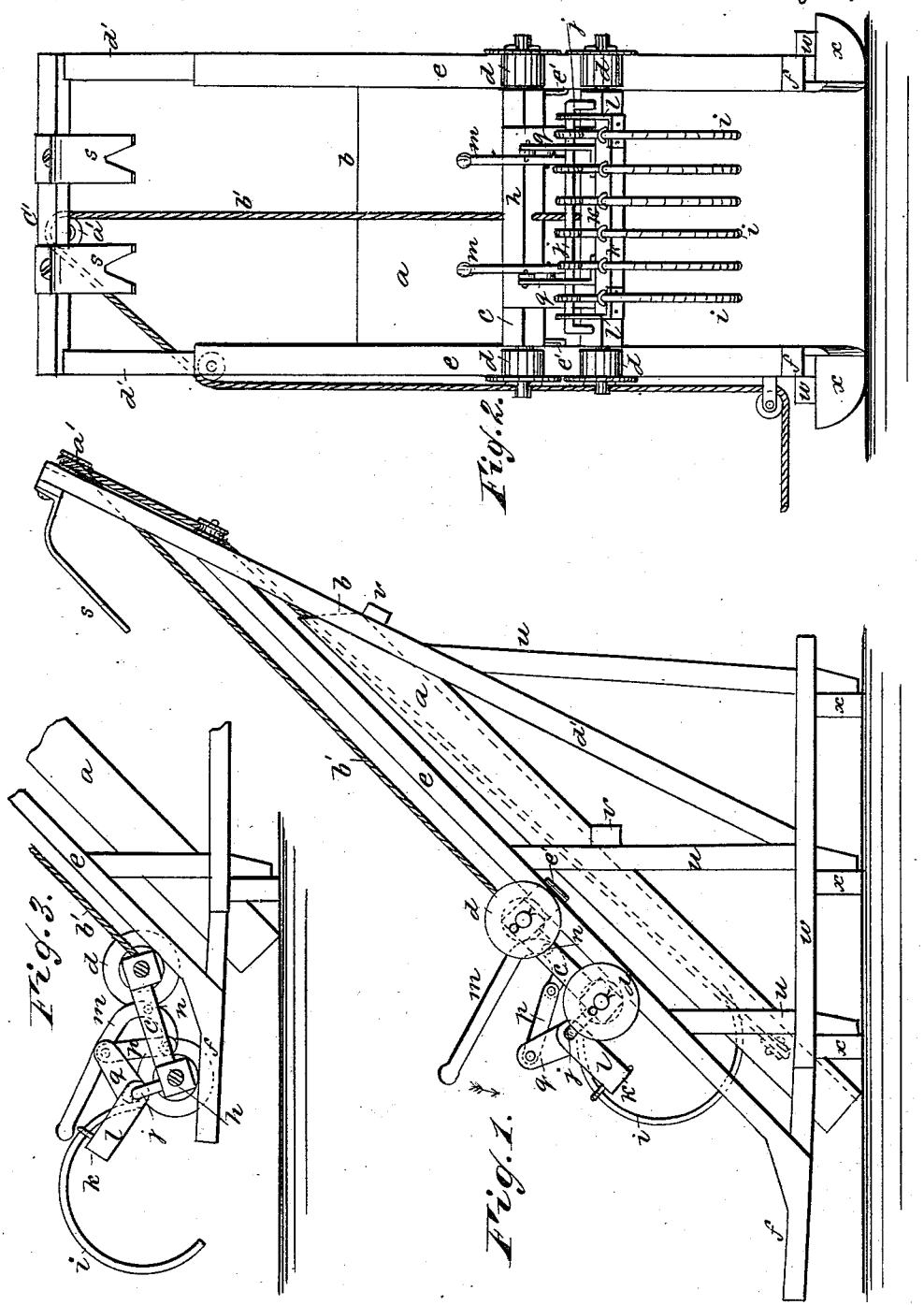

UNITED STATES PATENT OFFICE.

JOHAN C. TESTMAN, OF WISNER, NEBRASKA.

HAY-STACKER.

SPECIFICATION forming part of Letters Patent No. 277,378, dated May 8, 1883.

Application filed February 3, 1883. (No model.)

*To all whom it may concern:*

Be it known that I, JOHAN C. TESTMAN, of Wisner, in the county of Cuming and State of Nebraska, have invented a new and Improved Hay-Stacker, of which the following is a full, clear, and exact description.

My invention consists in improvements in the construction of the rake of a hay-stacker, for enabling the rake to take hold of the hay at the bottom of the inclined way up which it is to be raked to better advantage than as now constructed, and also to facilitate the discharge of the hay at the top of the said inclined way, all as hereinafter fully described and claimed.

Reference is to be had to the accompanying drawings, forming a part of this specification, in which the same letters of reference indicate the same or corresponding parts in all the figures.

Figure 1 is a side elevation of a hay-stacker having a rake constructed according to my invention. Fig. 2 is a front elevation, and Fig. 3 is a detail partly in section and partly in side elevation.

For hauling the hay up an inclined way, $a$, to discharge it over the top $b$ of said way onto a stack, I propose to employ a rake consisting of the truck-frame $c\ h$, mounted on the wheels $d$, to run up and down the trackways $e\ f$, and having a series of hook-teeth, $i$, pivoted on the rod $j$, and connected to the bar $k$, which is pivoted by its arms $l$ on said rod $j$, so that when the levers $m$, pivoted to the truck at $n$ and connected to said bar $k$ by links $p$ and elbow-levers $q$, are shifted, the said hook-fingers will be raised or lowered, as may be required. When the truck runs down to get the hay lying on the ground at the bottom of the inclined way, where it is delivered by the hay-sweep employed for gathering the hay thereto, the hook-fingers $i$ are then to be thrust down, as indicated in Fig. 1, by the attendant, who swings the levers $m$ upward from the position represented in Fig. 3, in which they rest, holding up said fingers when the truck runs down to allow fingers $i$ to be raised over the hay. When the truck is hauled up to the top of the incline, where the hay is to be discharged, the levers $m$ strike the forked stops $s$ just before the truck stops, by which the hook-teeth are raised for allowing the load to escape. Thus I have provided a rake that will engage the load at the bottom of the way with proper and satisfactory effect, and will automatically disengage it at the top, making a very useful and economical device for elevating hay to the stack. The rakeway $a$ is to be mounted by suitable light posts, $u$, and cross-pieces $v$ on a bed-frame, W, that is provided with runners $x$, by which the stacker is to be moved along the ground when desired, and the upper pulley, $a'$, for the hoisting-rope $b'$, by which the rake is to be hoisted, is mounted on the top bar, $c'$, of a hoisting-frame, of which the inclined posts $d'$ are the supports, said posts being suitably mounted on the frame that supports the ways $a$ and rails $e$. The truck has hook-guards $e'$ hooking under rails $e$, to prevent the truck from leaving the track.

Having thus fully described my invention, I claim as new and desire to secure by Letters Patent—

The combination, with a truck, of a bar, $k$, having pivoted arms $l$, a rod, $j$, the hook-teeth $i$, pivoted on said rod, the levers $m$, pivoted at $n$, and connected by links $p$ with the bars $k$, the elbow-levers $q$, and a frame having inclined track and forked stops $s$ at the top, whereby hay or other long feed may be carried up to the stack, as described.

JOHAN C. TESTMAN.

Witnesses:
S. S. KRAKE,
R. L. VANDERHULE.